US012403722B2

(12) United States Patent
Ford

(10) Patent No.: US 12,403,722 B2
(45) Date of Patent: Sep. 2, 2025

(54) HUBCAP

(71) Applicant: Amsted Rail Company, Inc., Chicago, IL (US)

(72) Inventor: Brian C. Ford, Moseley, VA (US)

(73) Assignee: Amsted Rail Company, Inc., Chicago, IL (US)

( * ) Notice: Subject to any disclaimer, the term of this patent is extended or adjusted under 35 U.S.C. 154(b) by 514 days.

(21) Appl. No.: 17/894,655

(22) Filed: Aug. 24, 2022

(65) Prior Publication Data

US 2024/0066915 A1 Feb. 29, 2024

(51) Int. Cl.
*B60B 7/00* (2006.01)
(52) U.S. Cl.
CPC .................................. *B60B 7/002* (2013.01)
(58) Field of Classification Search
CPC ..... B60B 7/0013; B60B 7/002; B60B 7/0046; B60B 7/066
See application file for complete search history.

(56) References Cited

U.S. PATENT DOCUMENTS

| | | | |
|---|---|---|---|
| 3,177,041 A * | 4/1965 | Isenbarger | B60B 7/002 301/108.2 |
| 5,024,488 A * | 6/1991 | Lindhuber | B60B 7/0013 301/108.4 |
| 5,172,984 A * | 12/1992 | Lederman | B60B 27/0073 384/489 |
| 5,192,117 A * | 3/1993 | Kuck | B60B 7/002 301/108.4 |
| 5,505,525 A | 4/1996 | Denton | |
| 5,785,390 A | 7/1998 | Gold et al. | |
| 5,860,708 A | 1/1999 | Borders et al. | |
| 9,290,044 B2 * | 3/2016 | Leung | B60B 7/002 |
| 11,021,009 B2 | 6/2021 | Jimenez et al. | |
| 2016/0144659 A1 * | 5/2016 | Yu | B60B 7/04 301/108.3 |
| 2019/0001650 A1 * | 1/2019 | Sohn | B32B 5/024 |

\* cited by examiner

*Primary Examiner* — Jason R Bellinger
(74) *Attorney, Agent, or Firm* — COZEN O'CONNOR

(57) ABSTRACT

A hubcap includes a monolithic main body. The monolithic main body includes (i) a sidewall having an annular cross-section, a hub end, and a vent end opposite the hub end, (ii) an end-cap abutting and spanning across the vent end, and (iii) a flange abutting and at least partially surrounding the hub end. The flange has an outer flange-surface facing the vent end and, opposite the outer flange-surface, an inner flange-surface that defines an annular channel.

19 Claims, 6 Drawing Sheets

HUBCAP

BACKGROUND

Wheeled motor vehicles include wheel hub assemblies, each of which attaches a respective wheel to the vehicle's axle. A wheel hub assembly may include bearings, seals, the axle, an axle nut, and other components within a hub cavity. The bearings interact with the axle to enable the wheel to rotate smoothly with minimal friction. The hub cavity further decreases friction and dissipates heat by lubricating the bearings. A hubcap prevents contaminates from entering a hub assembly, while also protecting the hub from impacts and tampering.

SUMMARY OF THE EMBODIMENTS

Typical hubcaps include a metal main body and a separate end-wall that covers a vent-end of the hubcap. The main body is metal to withstand impacts. The end-wall is transparent to enable viewing the lubricant chamber and oil level, which precludes the end-wall from being metal. Such a hubcap also includes a gasket between the main body and the end-wall, and may also include an additional gasket between the main body and the wheel hub. A common problem of many current hubcap designs is oil leakage at these gaskets. Embodiments of hubcaps disclosed herein remedy these problems. First, the hubcap's main body and end-wall are a single piece, such that there is no interface from which oil can leak. Second, the main body may include a sealing ring, which has one or more flanges to provide redundancy against leaks In a first aspect, a hubcap includes a monolithic main body. The monolithic main body includes (i) a sidewall having an annular cross-section, a hub end, and a vent end opposite the hub end, (ii) an end-cap abutting and spanning across the vent end, and (iii) a flange abutting and at least partially surrounding the hub end. The flange has an outer flange-surface facing the vent end and, opposite the outer flange-surface, an inner flange-surface that defines an annular channel.

DETAILED DESCRIPTION OF THE EMBODIMENTS

Figure 1:
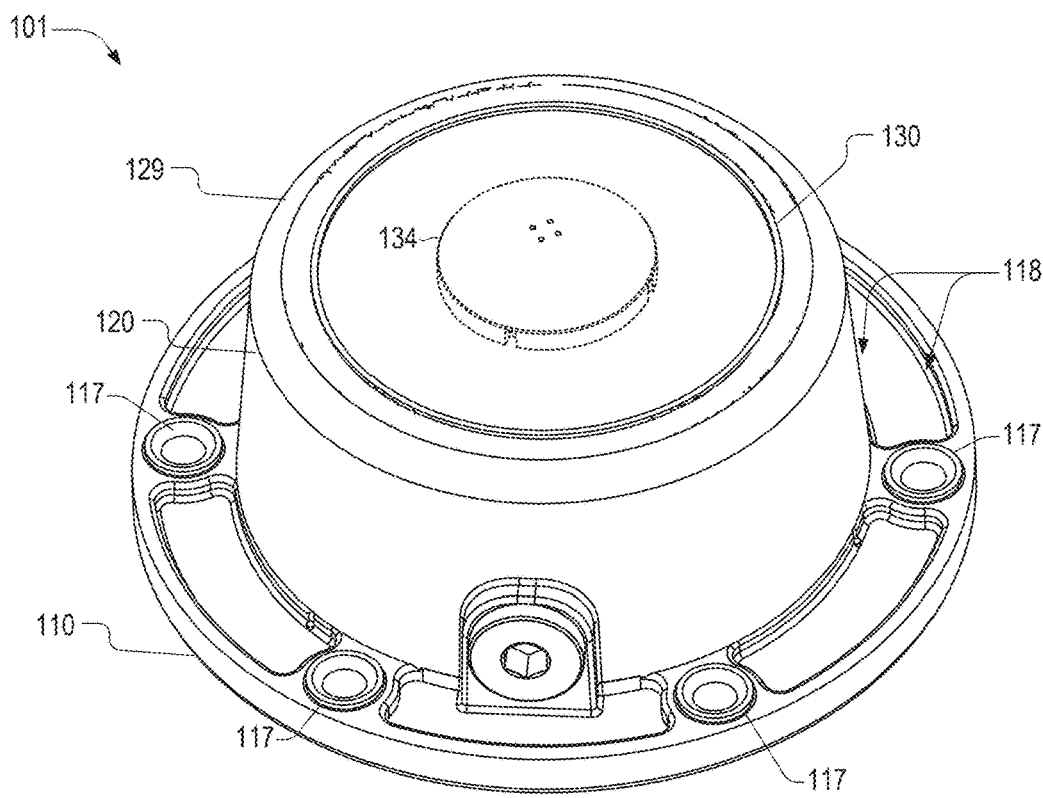
FIGS. 1-4 are respectively an isometric top view, an isometric bottom view, a first cross-sectional view, and a second cross-sectional view of a hubcap, in an embodiment.
Figure 2:
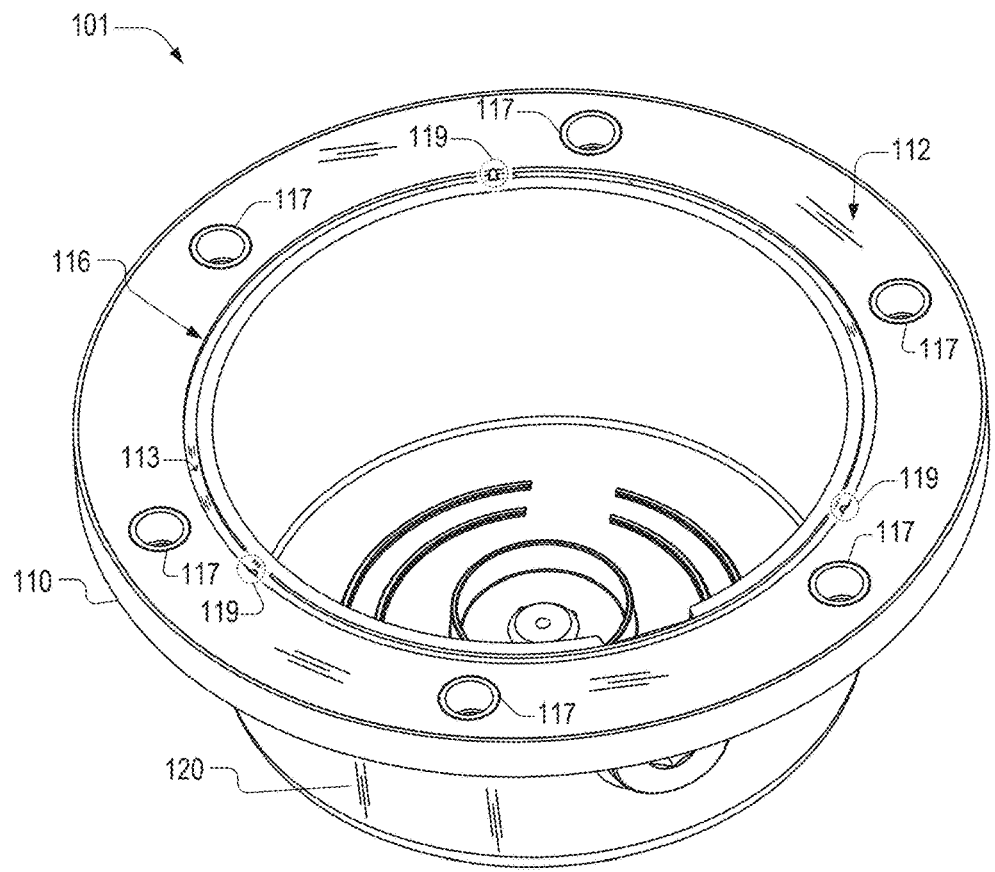
Figure 3:
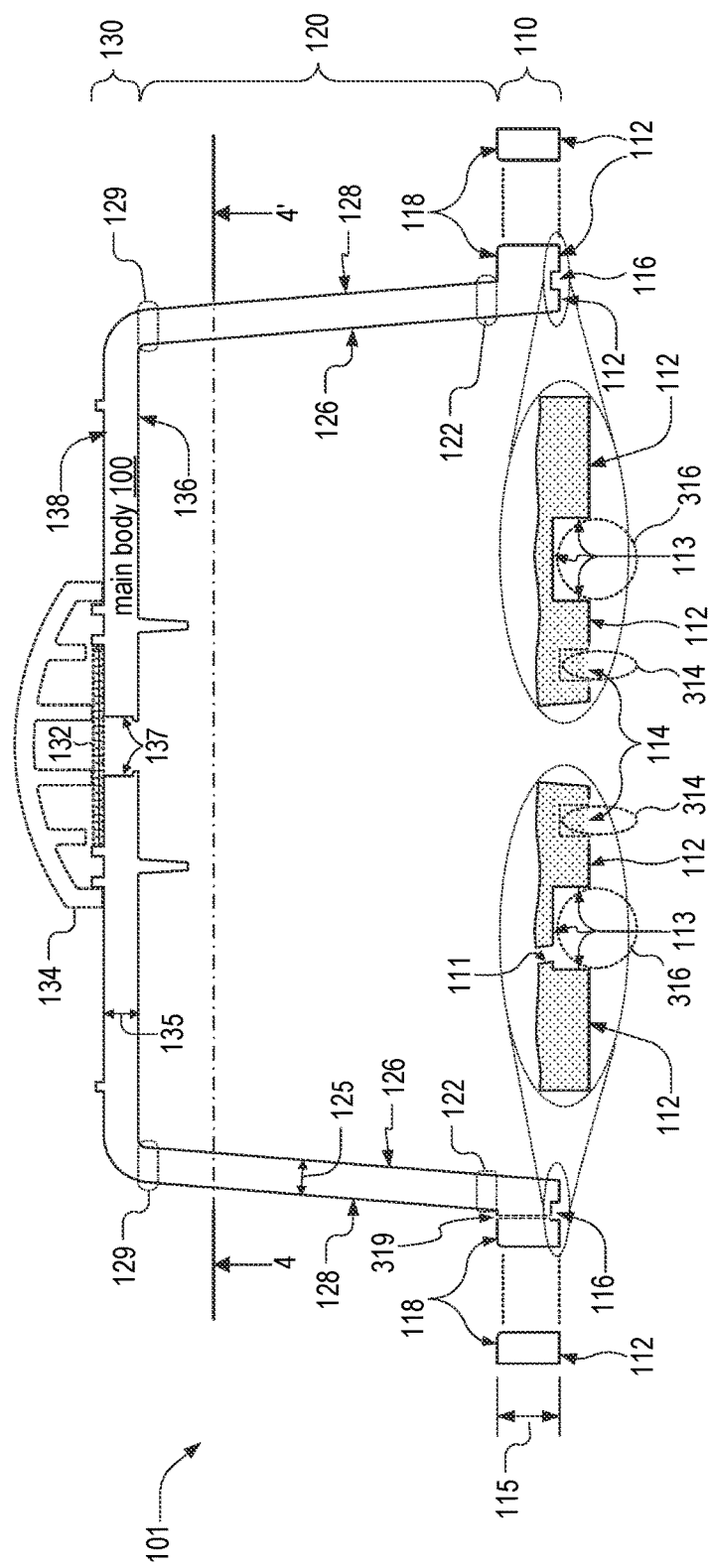
Figure 4:
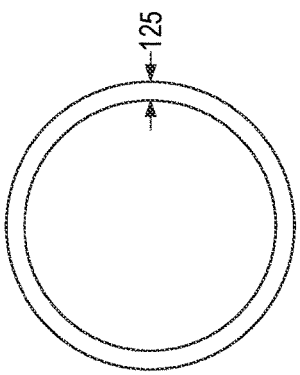

FIGS. 1, 2, and 3 are respectively an isometric top view, an isometric bottom view, and a cross-sectional view of a hubcap 101. Hubcap 101 incudes a monolithic main body 100, which has the following regions: a flange 110, a sidewall 120, and an end-cap 130. FIG. 4 is a cross-sectional view of sidewall 120 in a cross-sectional plane 4-4' shown in FIG. 3. FIGS. 1-4 are best viewed together in the following description.

Flange 110, sidewall 120, and end-cap 130 may be monolithic, e.g., formed of a single piece of material, such as a single continuous volume of material. Flange 110, sidewall 120, and end-cap 130 may be integrally formed, such that they make up a single piece or unit, and cannot be dismantled without destroying the integrity of main body 100 or any of its components.

When flange 110, sidewall 120, and end-cap 130 are not monolithic, main body 100 may be integrally formed by irremovable attachment of at least one of flange 110, sidewall 120, and end-cap 130, wherein, prior to said attachment, at least one of flange 110, sidewall 120, and end-cap 130 are separate pieces. For example, at least one of (a) flange 110 and sidewall 120 may be irremovably attached, and (b) sidewall 120 and end-cap 130 may be irremovably attached. The means of irremovable attachment may include welding, such as plastic welding, adhesive bonding, multi-part molding, or a combination thereof. At least two of flange 110, sidewall 120, and end-cap 130 may be formed of different respective materials. Main body 100 may include a volume of adhesive between at least one of at least one of (a) flange 110 and sidewall 120, and (b) sidewall 120 and end-cap 130.

Sidewall 120 has an annular cross-section, a hub end 122, and a vent end 129 opposite hub end 122. The annular cross-section of sidewall 120 may be a circular annulus, as shown in FIG. 4, or a non-circular annulus, such as a polygonal annulus. End-cap 130 abuts and spans across vent end 129. In embodiments, sidewall 120 and end-cap 130 respectively form the lateral surface and a base surface of a frustum, such as a conical frustum or a polygonal frustum. Sidewall 120 has an interior surface 126 and an exterior surface 128. End-cap 130 has an inner-facing surface 136 and an outer-facing surface 138. The cross-sectional plane of FIG. 3 is perpendicular to at least one of surfaces 136 and 138, and may bisect hubcap 101.

Flange 110 abuts and at least partially surrounds hub end 122. Flange 110 has an outer flange-surface 118 facing vent end 129, and opposite outer flange-surface 118, an inner flange-surface 112 that defines an annular channel 116. Specifically, inner flange-surface 112 includes a recessed region 113 that defines annular channel 116. In embodiments, inner flange-surface 112 also forms an annular channel 114, which is surrounded by annular channel 116.

As shown in FIG. 2, monolithic main body 100 may include a plurality of communication holes 119, each spanning between recessed region 113 and one of outer flange-surface 118 (as shown in FIG. 3) and exterior surface 128. FIG. 3 illustrates a communication hole 319, which is an example of communication hole 119 that is coplanar with a bolt-hole 117 in the cross-sectional plane of FIG. 3. Communication holes 119 may be coplanar with a bolt-hole 117, as in FIG. 3, or not coplanar in this sense, as illustrated by communication holes 119 of FIG. 2. For compatibility with tooling used in manufacturing main body 100, an axis of communication hole 319 may be at least one of (a) perpendicular to one or more of surfaces 112, 136, and 138, (b) parallel to an axis of a bolt-hole 117, and (c) parallel to a symmetry axis of main body 100.

Each communication hole 119 may be defined by a respective surface 111 of main body 100, which spans between recessed region 113 and one of outer flange-surface 118 (as shown in FIG. 3) and exterior surface 128. The total number of communication holes 119 of main body 100 may be between two and eight, inclusive. For example, FIG. 2 denotes three communication holes 119.

Inner flange-surface 112 may be a bottom surface of hubcap 101, such that when hubcap 101 is installed on a hub assembly, at least part of inner flange-surface 112 is in direct contact with one of (i) the hub assembly and (ii) a gasket or sealing ring disposed between hubcap 101 and the hub assembly. For example, hubcap 101 may include at least one of a sealing ring 316 located at last partially in annular channel 116, and a sealing ring 314 located at least partially in annular channel 114. Each of sealing rings 314 and 316 contribute forming a seal at the interface of inner flange-surface 112 and a surface of a hub assembly to which hubcap 101 is attached. In embodiments, hubcap 101 includes gasket, such as a flange gasket, removably attached to inner flange-surface 112. This gasket may function as at least one of sealing ring 314 and 316, such that part of the gasket is in at least one of annular channel 114 and 116.

Monolithic main body 100 may be formed a high-impact plastic, examples of which include polyethylene terephthalate (PET) and polycarbonate. The plastic may have an Izod Impact Strength of at least 860 joules per meter. Flange 110, sidewall 120, and end-cap 130 have respective thicknesses 115, 125, and 135, each of which may be between 4.5 millimeters and 8.0 millimeters. Monolithic main body 100 may be either opaque or transparent to visible light. Transparency of monolithic main body 100 enables visual inspection of oil levels in a hub assembly to which hubcap 101 is attached.

In embodiments, flange 110 includes a plurality of bolt-holes 117 for bolting main body 100 to a hub assembly. Flange 110 may also include a respective compression limiter in each bolt-hole 117 to prevent main body 100 from cracking when bolts through bolt-holes 117 are tightened.

In embodiments, hubcap 101 includes at least one of a vent 134 on outer-facing surface 138, and a filter 132 adjacent to outer-facing surface 138. At least one of filter 132 and vent 334 may be removably attached to end-cap 130. Vent 134 may be fixedly attached to end-cap 130. End-cap 130 may also include, between surfaces 136 and 138, a surface 137 that defines an aperture through end-cap 130.

Figure 5:
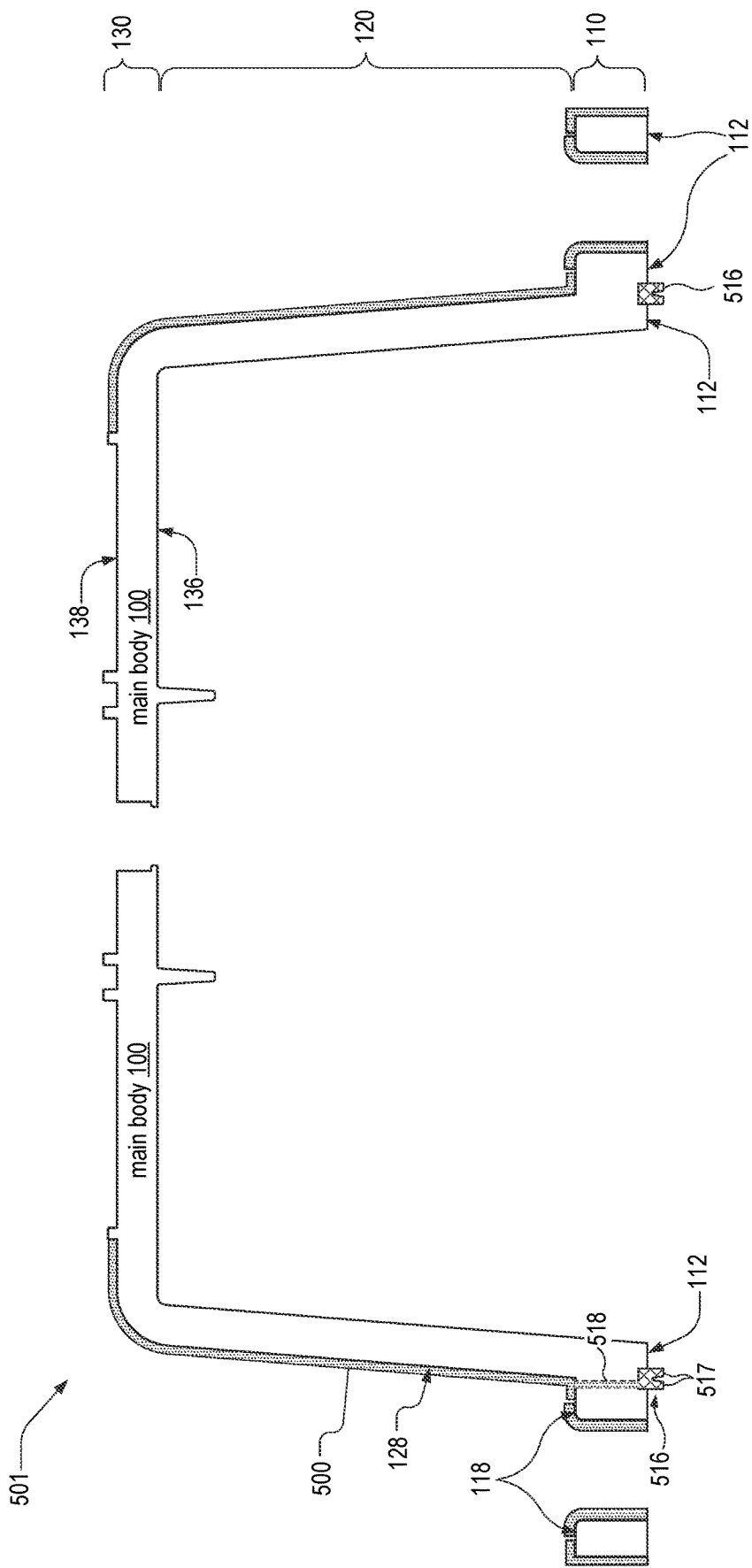
FIGS. 5-7 is a cross-sectional view of a hubcap that includes an overmold, in which the hubcap is an embodiment of the hubcap of FIGS. 1-4.
Figure 6:
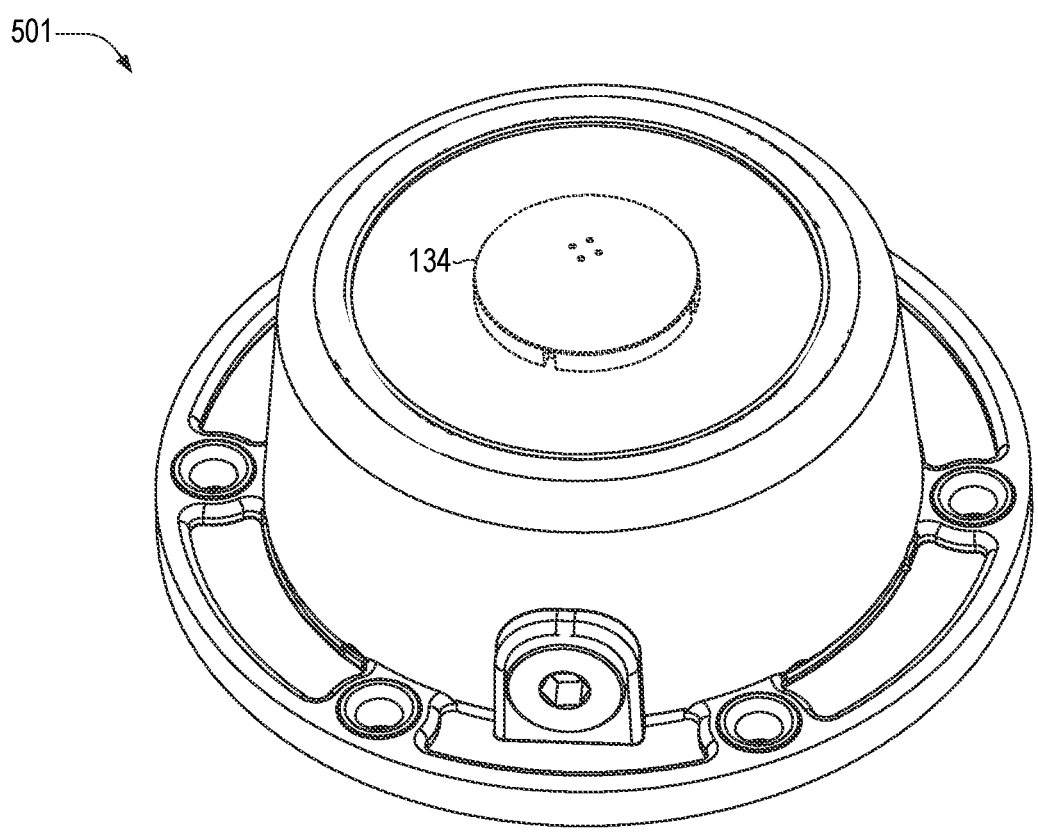

FIG. 5 is a cross-sectional view of a hubcap 501, which is an embodiment of hubcap 101. FIG. 6 is an isometric top view of hubcap 501. Hubcap 501 includes an overmold 500 and main body 100, which includes outer flange-surface 118 and exterior surface 128 of sidewall 120. Overmold 500 covers, and is conformal to, at least part of each of (i) the outer flange-surface 118 and exterior surface 128. Overmold 500 may also cover, and be conformal to, at least part of outer-facing surface 138 of end-cap 130. Overmold 500 may be formed of a thermoplastic elastomer, which increases hubcap 501's impact resistance. Overmold 500 also enables hubcap 501 to satisfies market demand for hubcaps that are at least partially opaque.

In embodiments, hubcap 101 includes a sealing ring 516 in annular channel 116. Sealing ring 516 is an example of sealing ring 316. For example, hubcap 501 may include sealing ring 516, as shown in FIG. 5. Sealing ring 516 may be bonded to recessed region 113. Sealing ring 516 may be either unconnected to overmold 500, or connected to overmold 500.

A cross-sectional shape of sealing ring 516 may be that of a convex shape, such as a circle, ellipse, or a convex polygon. Alternatively, the cross-sectional shape may be that of convex shape, e.g., one with multiple lobes 517 as shown in FIG. 5. Lobes 517 on provide redundancy against leaks.

When sealing ring 516 is connected to overmold 500, hubcap 501 may include a plurality of spokes 518, each of which is formed of the same material as at least one of overmold 500 and sealing ring 516. In embodiments, spokes 518 may be conformally attached to both sealing ring 516 and overmold 500. Each spoke 518 (a) extends through a respective communication hole 119, and (b) connecting respective region of sealing ring 516 with a respective region of overmold 500 that covers the respective communication hole 119. In such embodiments, sealing ring 516 and overmold 500 may be monolithic, that is, they are formed of a continuous piece of material.

Spokes 518 may be formed in the same process step as forming overmold 500 on main body 100. In such embodiments, spokes 518 and overmold 500 are monolithic, and spokes 518 may be conformally attached to sealing ring 516. Sealing ring may also be formed in the same process step as spokes 518 and overmold 500. In such embodiments, overmold 500, spokes 518, and sealing ring 516 may be monolithic Forming sealing ring 516 and overmold 500 during a same process step eliminates material and labor costs associated with a separate sealing ring. Sealing ring 516's being attached to overmold 500 also facilitates removal and reinstallation of hubcap 501, as there is no separate step of installing a separate ring, during which the separate ring might be damaged.

Each communication hole 119 may have a hydraulic diameter $D_h$ between 1.0 and 1.5 millimeters, inclusive. Hydraulic diameter $D_h$ may be defined as $D_h=4A/P$, where A and P are, respectively, the cross-sectional area and total perimeter of communication hole 119. When the hydraulic diameter exceeds one millimeter, communication holes 119 are sufficiently large to enable material of overmold 500 to flow through communication holes 119 and adjoin sealing ring 516. When the hydraulic diameter is less than 1.5 millimeter, communication holes 119 are sufficiently small that they do not interfere with bolt-holes 117.

Figure 7:
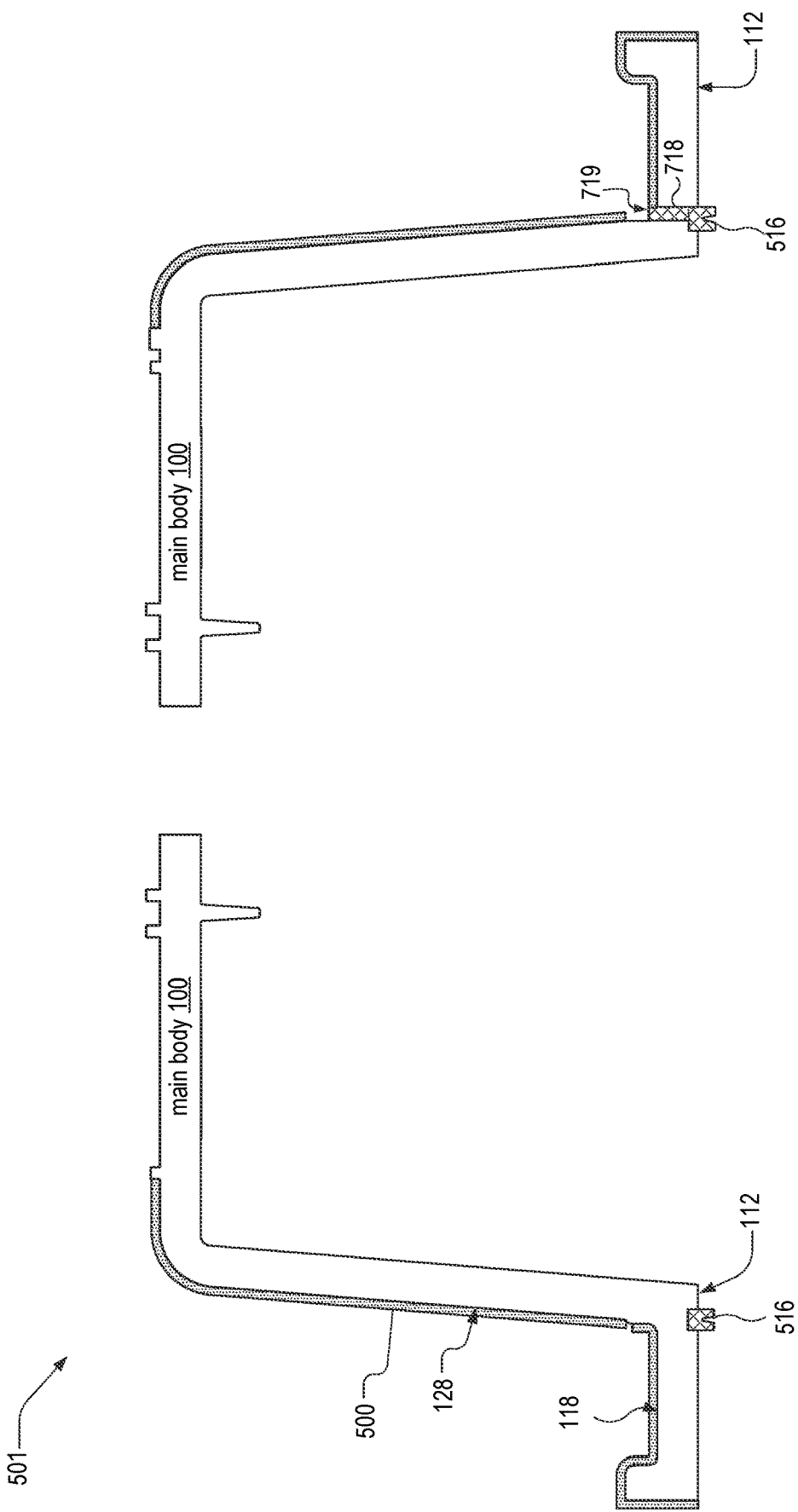

FIG. 7 is a cross-sectional view of hubcap 501, in a cross-sectional plane that does not include a bolt-hole 117. In such a cross-sectional plane, hubcap 501 may include a communication hole 719 and a spoke 718 therein. Communication hole 719 and spoke 718 are respective examples of communication hole 119 and spoke 518.

Figure 8:
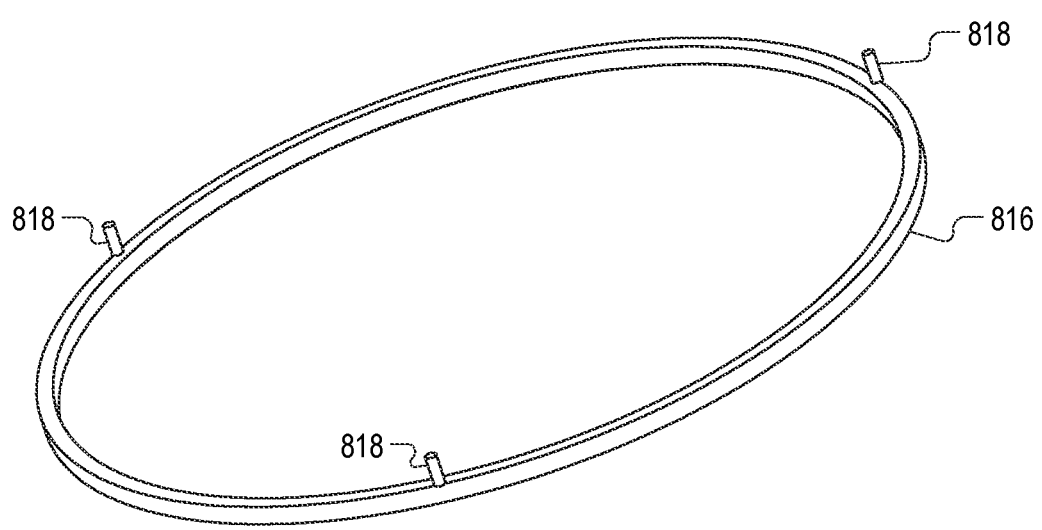
FIG. 8 is a schematic of a sealing ring included in embodiments of hubcaps of FIGS. 1-7.

FIG. 8 is a schematic of a sealing ring 816 and three spokes 818. Sealing ring 816 and spokes 818 may be a single piece of material, and may be part of a monolithic volume of material that includes overmold 500. Sealing ring 816 is an example of sealing ring 516. Each spoke 818 is an example of spokes 518 and 718. In embodiments, sealing ring 816 is in annular channel 116, and each spoke 818 is in a respective communication hole 119 shown in FIG. 1.

Combinations of Features

Features described above as well as those claimed below may be combined in various ways without departing from the scope hereof. The following enumerated examples illustrate some possible, non-limiting combinations:

(A1) A hubcap includes: a monolithic main body including (i) a sidewall having an annular cross-section, a hub end, and a vent end opposite the hub end, (ii) an end-cap abutting and spanning across the vent end, and (iii) a flange abutting and at least partially surrounding the hub end. The flange has an outer flange-surface facing the vent end and, opposite the outer flange-surface, an inner flange-surface that defines an annular channel.

(A2) Embodiments of hubcap (A1) further include an overmold covering, and conformal to, at least part of each of (i) the outer flange-surface and (ii) an exterior surface of the sidewall.

(A3) In embodiments of hubcap (A2), the overmold also covers, and is conformal to, at least part of the end-cap.

(A4) In embodiments of either of hubcaps (A2) and (A3), the overmold is formed of a thermoplastic elastomer.

(A5) Embodiments of any of hubcaps (A2)-(A4) further include a sealing ring disposed in the annular channel.

(A6) In embodiments hubcap (A5), the sealing ring and the overmold are unconnected.

(A7) In embodiments of either of hubcaps (A5) and (A6), the inner flange-surface includes a recessed region that defines the annular channel, and the sealing ring is bonded to the recessed region.

(A8) In embodiments of any of hubcaps (A5)-(A7), the inner flange-surface includes a recessed region that defines the annular channel, and the monolithic main body includes a plurality of communication holes each spanning between the recessed region and a surface of the hubcap covered by the overmold. In such embodiments, the hubcap further includes a plurality of spokes. Each of the plurality of spokes (a) extends through a respective communication hole of the plurality of communication holes, and (b) connects a respective region of the sealing ring with a respective region of the overmold that covers the respective communication hole.

(A9) In embodiments of hubcap (A8), a number of the plurality of communication holes being between two and eight.

(A10) In embodiments of either of hubcaps (A8) and (A9), each of the plurality of communication holes having a hydraulic diameter between 1.0 millimeters and 1.5 millimeters.

(A11) In embodiments of any of hubcaps (A8)-(A10), the inner flange-surface includes a recessed region that defines the annular channel, each of the plurality of communication holes each spanning between the recessed region and one of (i) the outer flange-surface and (ii) a surface of the sidewall.

(A12) In embodiments of any of hubcaps (A8)-(A11), the main body has a plurality of interior surfaces, each of the plurality of interior surfaces (i) defining a respective one of the plurality of communication holes and (ii) spanning between the recessed region and a surface of the hubcap covered by the overmold.

(A13) In embodiments of any of hubcaps (A1)-(A12), the main body is formed of a high-impact plastic.

(A14) In embodiments of any of hubcaps (A1)-(A13), the main body is transparent to visible light.

(A15) In embodiments of any of hubcaps (A1)-(A13), the main body is opaque to visible light.

(A16) In embodiments of any of hubcaps (A1)-(A15), a thickness of the main body is between 4.5 mm and 8.0 mm.

(A17) In embodiments of any of hubcaps (A1)-(A16), the monolithic main body has an Izod Impact Strength of at least 860 joules per meter.

(A18) In embodiments of any of hubcaps (A1)-(A17), the inner flange-surface is a bottom surface of the hubcap.

(A19) Embodiments of any of hubcaps (A1)-(A18) further include a vent attached to an outer-facing surface of the end-cap; and a filter removably attached in an inner-facing surface of the end-cap.

Changes may be made in the above methods and systems without departing from the scope of the present embodiments. It should thus be noted that the matter contained in the above description or shown in the accompanying drawings should be interpreted as illustrative and not in a limiting sense. Herein, and unless otherwise indicated, the phrase "in embodiments" is equivalent to the phrase "in certain embodiments," and does not refer to all embodiments. The following claims are intended to cover all generic and specific features described herein, as well as all statements of the scope of the present method and system, which, as a matter of language, might be said to fall therebetween.

What is claimed is:

1. A hubcap comprising:
   a monolithic main body including (i) a sidewall having an annular cross-section, a hub end, and a vent end opposite the hub end, (ii) an end-cap abutting and spanning across the vent end, and (iii) a flange abutting and at least partially surrounding the hub end;
   the flange having an outer flange-surface facing the vent end and, opposite the outer flange-surface, an inner flange-surface that defines an annular channel; and
   the monolithic main body including a plurality of communication holes each spanning between the annular channel and the outer flange-surface.

2. The hubcap of claim 1, further comprising an overmold covering, and conformal to, at least part of each of (i) the outer flange-surface and (ii) an exterior surface of the sidewall.

3. The hubcap of claim 2, the overmold also covering, and conformal to, at least part of the end-cap.

4. The hubcap of claim 2, the overmold comprising a thermoplastic elastomer.

5. The hubcap of claim 2, further comprising a sealing ring disposed in the annular channel.

6. The hubcap of claim 5, the sealing ring and the overmold being unconnected.

7. The hubcap of claim 5, the inner flange-surface including a recessed region that defines the annular channel, the sealing ring being bonded to the recessed region.

8. The hubcap of claim 5, the inner flange-surface including a recessed region that defines the annular channel,
   the hubcap further comprising a plurality of spokes, each of the plurality of spokes (a) extending through a respective communication hole of the plurality of communication holes, and (b) connecting a respective region of the sealing ring with a respective region of the overmold that covers the respective communication hole.

9. The hubcap of claim 8, a number of the plurality of communication holes being between two and eight.

10. The hubcap of claim 8, each of the plurality of communication holes having a hydraulic diameter between 1.0 millimeters and 1.5 millimeters.

11. The hubcap of claim 8, the inner flange-surface including a recessed region that defines the annular channel, each of the plurality of communication holes each spanning between the recessed region and one of (i) the outer flange-surface and (ii) a surface of the sidewall.

12. The hubcap of claim 8, the main body having a plurality of interior surfaces, each of the plurality of interior surfaces (i) defining a respective one of the plurality of communication holes and (ii) spanning between the recessed region and a surface of the hubcap covered by the overmold.

13. The hubcap of claim 1, the main body being formed of a high-impact plastic.

14. The hubcap of claim 1, the main body being transparent to visible light.

15. The hubcap of claim 1, the main body being opaque to visible light.

16. The hubcap of claim 1, a thickness of the main body being between 4.5 mm and 8.0 mm.

17. The hubcap of claim 1, the monolithic main body having an Izod Impact Strength of at least 860 joules per meter.

18. The hubcap of claim 1, the inner flange-surface being a bottom surface of the hubcap.

19. The hubcap of claim 1, further comprising:
a vent attached to an outer-facing surface of the end-cap; and
a filter removably attached in an inner-facing surface of the end-cap.

* * * * *